Oct. 14, 1958 R. WINKLER ET AL 2,856,189
METHOD OF AND APPARATUS FOR STACKING
ENVELOPES AND LIKE ARTICLES
Filed Oct. 12, 1955

INVENTOR.
Richard Winkler and
Kurt Dünnebier.
BY Fishburn & Mullendore
ATTORNEYS.


United States Patent Office 2,856,189  
Patented Oct. 14, 1958

2,856,189

METHOD OF AND APPARATUS FOR STACKING ENVELOPES AND LIKE ARTICLES

Richard Winkler, Rengsdorf, and Kurt Dünnebier, Neuwied, Rhine, Germany, assignors to Berkley Machine Company, Kansas City, Mo., a corporation of Missouri Application October 12, 1955, Serial No. 540,062

Claims priority, application Germany October 18, 1954

12 Claims. (Cl. 271—69)

This invention relates to a method of and apparatus for gathering and stacking various articles such as envelopes, wrappers, bags and the like as they emerge from machines used for making, folding, and/or printing them.

Machines of the above mentioned type usually deposit the articles in flat and mutually overlapping position on a conveyor belt or apron which operates slowly over a table and from which the articles are subsequently collected by the operator of the machine. This method has the great drawback that it requires a considerable amount of space and besides, the extensive array of articles on the table makes it impossible for the operator to attend to the collection and distribution of the articles without frequently changing his position along the table. It is also necessary for the operator to jostle and straighten the articles by hand prior to stacking and/or packaging thereof.

It has also been a prior practice to provide for the delivery of the articles onto the table upright or on edge position. This method, no doubt, avoids some of the disadvantages which are referred to, but it has the serious drawback in that the articles are delivered at the full speed of the machine so that the push of each article against the stack is with considerable force. Consequently, it stands to reason that when the articles are fragile they are frequently damaged. This leads to disturbance, loss in sequence, time and production. There is also the risk of one article getting caught with a part of a preceding article which leads to considerable disturbance in the delivery and stacking of the articles.

With the above difficulties in mind, a principal object of the present invention is to provide a method of and apparatus for gathering and stacking such articles in a safe and orderly manner with a minimum time and effort on the part of the operator.

Further objects of the invention are to provide an apparatus for gathering and stacking articles delivered from machines of the aforementioned type which requires very little space and in which the final movement of the articles is toward the machine so that the operator may also observe and attend the operations of the machine with a minimum of back and forth movement between the machine and the place at which the articles are removed, and to provide an apparatus for gathering and stacking articles delivered from machines of the aforementioned type whereby the speed of delivery is gradually decreased so that one article becomes carefully inserted at the back of the others as they are being carried in stacked relation to the point of removal.

A further object of the invention is to provide an apparatus for so timing and feeding the stack of finished articles that undue haste is avoided on the part of the operator in attending the apparatus or the machine and to thereby avoid damage and fear of damage to the articles.

A still further object is to provide an apparatus for gathering and stacking articles that is readily adjusted to suit various sizes of articles in both the delivery and stacking parts by which the articles are arranged in upright position for their ultimate stacking in closely packed upright formation.

In accomplishing these and other objects of the invention as hereinafter described we have provided an improved method and apparatus illustrated in the accompanying drawing wherein.

Figure 1:
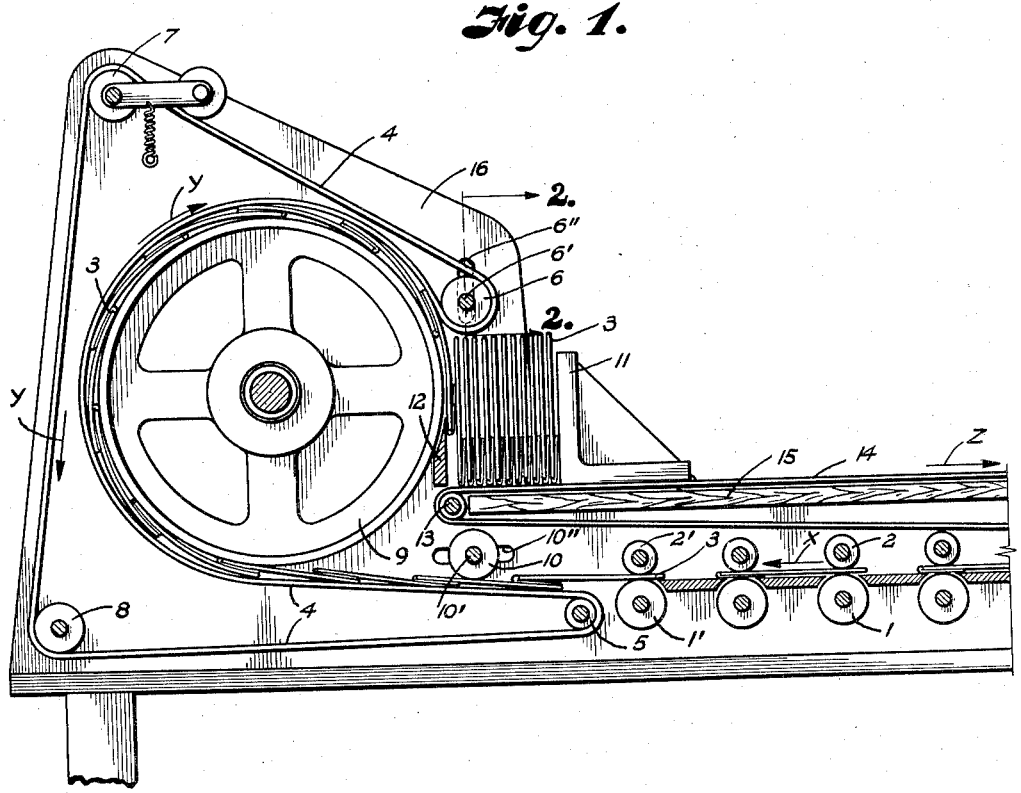
Fig. 1 is a side elevation somewhat diagrammatic of an apparatus for gathering and stacking articles in accordance with the present invention.

Referring more in detail to the drawing:

The apparatus illustrated is for gathering and stacking envelopes, although it is to be understood that the invention pertains to any article of stationery or the like that is discharged in rapid sequence from a machine for making, folding or printing such articles.

Figure 2:
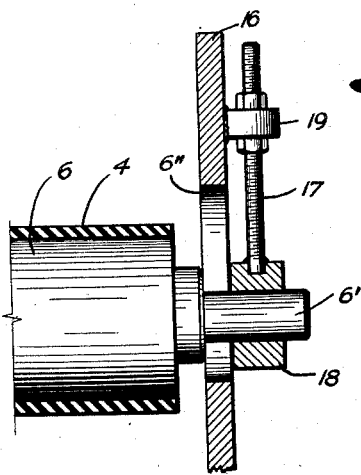
Fig. 2 is a section on the line 2—2 of Fig. 1 showing an adjustment for the rollers which stack the articles.

The gathering and stacking apparatus includes a substantially horizontal table 15 that is supported between side frames 16 that may be supported on the floor to extend away from the delivery end of the machine. Carried below the table 15, between the side frames 16, is a series of feed rollers 1 which cooperate with guide rollers 2 in feeding the envelopes through a horizontal path at the speed from which they are discharged from the machine. Positioned between the side frames of the machine parallel with the last of the feed rollers 1' is a roller 5 which cooperates with a spaced roller 8, an upper roller 7, and roller 6 that is adjustable in slots 6" to guide one or more bands of a conveyor 4 about the circumference of a drum or cylinder 9. The drum or cylinder 9 is rotatably mounted between the side frames 16 at the end of the table 15 and is positioned to rotate, at a slower speed than the feed rollers 1, on a horizontal axis above the level of the table, as shown in Fig. 1 of the drawing. The conveyor 4 operates at the same linear speed as the periphery of the drum 9 in the direction of the arrows "y" and travels from the roller 5 around the periphery of the drum 9, under the adjustable roller 6, over the roller 7, and around the roller 8 to the roller 5. The portion of the bands of the conveyor between the roller 5 and the drum 9 form a slightly upwardly inclined apron on which the envelopes are partially lapped when engaged by the roller 10. The roller 10 operates at a slower speed and is adjustably mounted in the side frames, for example, in slots 10". The portions of the bands which extend about the periphery of the drum 9 hold the envelopes in partially overlapped relation so that they are guided around the drum 9 to drop onto the upper run of the conveyor 14 that travels rearwardly along the top of the table in the direction of the machine and the lower run thereof returns under the table to a guide roller 13 at the end of the table 15. The envelopes are stripped from the drum and are guided onto the conveyor 14 by a transversely arranged and vertically positioned stop plate 12. The apparatus also includes an abutment or rest 11 that is positioned on the upper run of the conveyor 14 to form a backstop for the envelopes as they are collected on the top of the table. The rollers 6 and 10 are supported in the slots 6" and 10" respectively by screws 17 which carry bearings 18 for the pins 6' and 10' of the rollers and which are adjustable in lugs 19 that project from the side frames 16 in the manner shown in Fig. 2.

When the apparatus is in operation the feed rollers 1 and guide rollers 2 forward the envelopes 3 from the machine at the working speed of the machine. The envelopes advance in the direction of the arrow "x" onto the apron portion of the conveyor 4. After the envelopes 3 are fed from the last of the rollers 1'—2' they are deposited at a reduced rate of speed when they contact the roller 10 in a flat overlapped formation, as shown in the drawing. The bands of the conveyor 4 then carry the envelopes in such lapped formation around the periphery of the drum or cylinder 9 until they are released by the release roller 6. The envelopes then drop in an upright position with the flaps directed downwardly onto the conveyor 14 between the stop plate 12 and the rest 11 that rides upon the conveyor 14. The conveyor 14 moves with a slow speed so that the envelope is carried away from the guide plate 12 to allow the following envelope which is partially lapped therewith onto the conveyor 14 to follow behind the preceding envelope. The envelopes thus deposited are moved along the table by the conveyor 14 in following relation with the rest 11 to form a horizontal stack of the envelopes with the envelopes retained in upright position on the edges thereof.

The envelopes forming the stack are moved by the conveyor 14 in the direction of the arrow "z" toward the machine, from which they were originally discharged and at such low speed that there will be sufficient room left on the conveyor 14 for newly deposited envelopes before the number to be removed reaches the end of the table. The operator of the machine can thus be stationed at the delivery end of the table 15 in a position to remove the stacked envelopes from the table and to observe and control operation of the machine. When a stack of envelopes is removed by the operator, the rest 11 is repositioned on the conveyor 14 to support the envelopes that are being advanced thereon.

From the foregoing it is obvious that we have provided a method of and apparatus for gathering such articles as envelopes in a safe and orderly manner with minimum time and effort on the part of the operator. It is also obvious that the apparatus requires very little space for the final movement of the envelopes to the place of removal. Also the operator may observe and attend operations of the machine with a minimum back and forth movement between the machine and the place where the envelopes are removed. It is also obvious that the speed of delivery of the envelopes is gradually decreased so that the envelopes are carefully deposited one back of the other and are delivered in stacked relation to the point of removal. The apparatus may be readily adjusted to different sizes of envelopes merely by adjusting the relative positions of the rollers 10 and 6, the roller 10 being adjusted relatively to the position at which the envelopes are discharged from the last of the rollers 1'—2' and the roller 6 being adjustable to and from the table according to the height of the envelopes.

What we claim and desire to secure by Letters Patent is:

1. The method of gathering and stacking envelopes delivered from a machine including, advancing the envelopes consecutively at the working speed of the machine, moving the envelopes at a reduced speed to cause them to assume a mutually overlapping relation, reversing the direction of movement of the lapped envelopes, dropping the envelopes after reversal thereof from said overlapping relation into side to side relation with the envelopes supported on edges thereof, and finally moving the envelopes at a further reduced speed toward the machine from which they were discharged to a place of removal.

2. The method of gathering and stacking envelopes delivered from a machine including, advancing the envelopes consecutively at the working speed of the machine in a substantially horizontal direction away from the machine, moving the envelopes at a reduced speed to cause them to assume a mutually overlapping relation, reversing the direction of movement of the lapped envelopes, dropping the envelopes after reversal thereof from said overlapping relation into side to side relation with the envelopes supported on edges thereof, and finally moving the envelopes at a further reduced speed toward the machine from which they were discharged to a place of removal.

3. The method of gathering and stacking envelopes delivered from a machine including, advancing the envelopes consecutively with flaps of said envelopes leading in a horizontal direction at substantially the working speed of the machine, then moving the envelopes at reduced speed to cause the envelopes to assume a position with the flap ends of an envelope overlapping the opposite closed end of the preceding envelope, reversing the travel of the overlapped envelopes, then transferring the envelopes into a stack with the flaps directed downward, and moving the envelopes in said stack at a reduced speed to a place of removal.

4. The method of gathering and stacking envelopes discharged from a machine including, advancing the envelopes consecutively with their flaps leading in a horizontal direction at substantially the working speed of the machine, moving the envelopes at a reduced speed to cause them to assume a position with the flap end of one enveloye overlapping the closed end of a preceding envelope, moving the envelopes in lapped relation to an inverted position, dropping the envelopes one behind the other with the flaps downwardly into horizontal registry to form a substantially closely packed stack, and moving the stack at a reduced speed to a place of removal.

5. An apparatus for gathering and stacking envelopes delivered from a machine including, means for advancing the envelopes consecutively at the working speed of the machine, conveying means for moving the envelopes at a reduced speed to cause them to assume a mutually overlapping relation and for carrying the envelopes in a reverse direction to a vertical position, means for supporting the envelopes on edge, means for transferring the envelopes from said conveying means to said supporting means as the envelopes reach said vertical position to provide a stack of the envelopes supported on edge and in side to side relation, and means for moving the stack of envelopes at a further reduced speed along said supporting means for collection of the envelopes in comparatively closely packed condition.

6. An apparatus for gathering and stacking envelopes delivered from a machine including, means for advancing the envelopes consecutively at the working speed of the machine in a substantially horizontal direction, means for moving the envelopes at a reduced speed to cause them to assume a mutually overlapping relation, means for reversing the direction of the envelopes and carrying the envelopes while in said overlapping relation into an upright position with the envelopes supported on edge and in side to side relation, and means for moving the envelopes in said side to side relation at a further reduced speed for collection in comparatively closely packed condition.

7. An apparatus for gathering and stacking envelopes delivered from a machine including, means for advancing the envelopes consecutively with flaps of said envelopes leading in a horizontal direction at substantially the working speed of the machine, means in receiving relation with the first-named means for moving the envelopes at reduced speed with the flap ends of the one envelope overlapping the opposite closed end of a preceding envelope and for reversing the lapped envelopes into upright position with the flaps directed downward, and means for moving the envelopes in said upright position from said last named means into a comparatively closely packed stack.

8. An apparatus for gathering and stacking finished envelopes delivered from a machine comprising, a delivery table, a plurality of feed and guide rollers arranged in pairs for advancing said envelopes at the working speed below said table, means at the delivery end of said last pair of feed and guide rollers for gathering the envelopes at a reduced rate of speed into mutually overlapping relation, said means including a reversing cylinder, means supporting the reversing cylinder at the end of the table for rotation on a horizontal axis, an endless belt, rollers for guiding a portion of the endless belt in the form of an apron in receiving relation with said last pair of feed and guide rollers and to carry the envelopes around a portion of the reversing cylinder in said lapped relation therebetween and over the top of the cylinder, one of said belt guiding rollers comprising a stacking roller to release the envelopes to drop on edge from the cylinder and onto the table in an upright formation, and means for moving the dropped envelopes along said table in said formation and at a reduced speed to a place of removal.

9. An apparatus as described in claim 8 wherein said stacking roller is adjustable vertically to and from the table in accordance with the shape and size of the envelopes.

10. An apparatus as described in claim 8 wherein the gathering means also includes a roller above the apron, and said roller being adjustable to and from said last pair of feed and guide rollers in accordance with the size and shape of the envelopes.

11. The method of gathering and stacking envelopes delivered from a machine including advancing the envelopes consecutively at substantially the working speed of the machine in a substantially horizontal direction, overlapping a closure flap portion of one envelope with a preceding envelope, continuing the advance of the envelopes in overlapping contact, holding the envelopes in said overlapping contact while reversing the direction of movement of the overlapped envelopes, transferring the envelopes after reversal thereof from said overlapping relation into a side by side relation with the envelopes supported on edges thereof, and finally moving the stack of envelopes at a further reduced speed toward the machine to a place of removal.

12. An apparatus for gathering and stacking envelopes as they are delivered from a machine comprising a delivery table for receiving and conveying the finished envelopes, a plurality of feed and guide rollers arranged under the table for advancing the envelopes at substantially the working speed of the machine to near the end of the table, conveying means at said end of the table for reversing the direction of the envelopes and carrying the envelopes to a vertical position above the table, means cooperating with said conveying means and the last pair of feed and guide rollers for arranging the envelopes in mutually overlapping relation on said conveying means, and means traveling over the table to carry the envelopes in said vertical position into closely packed relation on said table.

References Cited in the file of this patent

UNITED STATES PATENTS

| | | |
|---|---|---|
| 1,269,673 | Armstrong | June 18, 1918 |
| 2,082,240 | Belluche et al. | June 1, 1937 |
| 2,140,112 | Novick | Dec. 13, 1938 |
| 2,233,850 | Rapley | Mar. 4, 1941 |
| 2,421,874 | Fouse | June 10, 1947 |

FOREIGN PATENTS

| | | |
|---|---|---|
| 530,526 | Germany | Mar. 23, 1930 |
| 766,133 | France | June 21, 1934 |